US012784552B2

(12) United States Patent
Birnie et al.

(10) Patent No.: US 12,784,552 B2
(45) **Date of Patent: *Nov. 3, 2026**

(54) DISPLAY WITH INTEGRATED CAMERAS

(71) Applicant: NCR Voyix Corporation, Atlanta, GA (US)

(72) Inventors: Steven James Birnie, Dundee (GB); Ian McFarlane Denny, Perth (GB); Michael Peter Gillies, Errol (GB)

(73) Assignee: NCR Voyix Corporation, Atlanta, GA (US)

( * ) Notice: Subject to any disclaimer, the term of this patent is extended or adjusted under 35 U.S.C. 154(b) by 271 days.

This patent is subject to a terminal disclaimer.

(21) Appl. No.: 18/397,242

(22) Filed: Dec. 27, 2023

(65) Prior Publication Data

US 2024/0135787 A1 Apr. 25, 2024

Related U.S. Application Data

(63) Continuation of application No. 17/951,738, filed on Sep. 23, 2022, now Pat. No. 11,922,783, which is a (Continued)

(51) Int. Cl.

*G07G 1/00* (2006.01)
*A47F 9/04* (2006.01)

(Continued)

(52) U.S. Cl.

CPC ........... *G07G 1/0054* (2013.01); *A47F 9/047* (2013.01); *G06F 3/0412* (2013.01); *G06Q 20/18* (2013.01); *H04N 23/45* (2023.01)

(58) Field of Classification Search

CPC ...... G07G 1/0054; H04N 23/45; A47F 9/047; G06F 3/0412; G06Q 20/18

See application file for complete search history.

(56) References Cited

U.S. PATENT DOCUMENTS 7,909,248 B1 * 3/2011 Goncalves ........... G07G 1/0072 235/462.14
9,589,433 B1 * 3/2017 Thramann .............. G07G 3/003

(Continued)

FOREIGN PATENT DOCUMENTS

EP 3514772 A1 7/2019

OTHER PUBLICATIONS

Bobbit, Russell, et al. "Visual item verification for fraud prevention in retail self-checkout." 2011 IEEE Workshop on Applications of Computer Vision (WACV). IEEE, 2011. (Year: 2011).*

(Continued)

*Primary Examiner* — Nathan A Mitchell

(74) *Attorney, Agent, or Firm* — Schwegman Lundberg & Woessner, P.A.

(57) ABSTRACT

A display includes two-integrated cameras. A first camera is situated in a top right corner of a front display surface of the display and a second camera is situated in a top left corner of the front display surface. The display is connected to a transaction terminal with the first camera focused on a bagging area associated with the transaction terminal and with the second camera focused on a staging area associated with the transaction terminal. Each camera captures images of items and the item images are streamed over a high-speed display port directly to the transaction terminal. The transaction terminal performs item recognition, item tracking, and auditing on the items based the item images during transaction processing at the transaction terminal.

19 Claims, 5 Drawing Sheets

Related U.S. Application Data continuation of application No. 16/451,705, filed on Jun. 25, 2019, now Pat. No. 11,462,083.

(51) Int. Cl.

| | |
|---|---|
| ***G06F 3/041*** | (2006.01) |
| ***G06Q 20/18*** | (2012.01) |
| ***H04N 23/45*** | (2023.01) |

(56) References Cited

U.S. PATENT DOCUMENTS

| | | | | |
|---|---|---|---|---|
| 10,078,827 | B2 | 9/2018 | Li et al. | |
| 10,192,087 | B2 | 1/2019 | Davis et al. | |
| 10,192,208 | B1 * | 1/2019 | Catoe | G07G 1/0054 |
| 10,902,435 | B2 | 1/2021 | Miyagi | |
| 11,481,751 | B1 * | 10/2022 | Chaubard | G06V 10/82 |
| 11,482,082 | B2 * | 10/2022 | Farrow | G06V 40/161 |
| 11,599,864 | B2 | 3/2023 | Edwards et al. | |
| 2003/0120547 | A1 | 6/2003 | Walter et al. | |
| 2006/0243798 | A1 * | 11/2006 | Kundu | G07G 3/00 235/383 |
| 2009/0039164 | A1 * | 2/2009 | Herwig | G07G 1/14 235/462.41 |
| 2009/0060259 | A1 | 3/2009 | Goncalves | |
| 2011/0295704 | A1 | 12/2011 | Edwards | |
| 2012/0158529 | A1 * | 6/2012 | Edwards | G06Q 20/208 705/16 |
| 2014/0021258 | A1 | 1/2014 | Olmstead | |
| 2015/0085184 | A1 | 3/2015 | Vidal et al. | |
| 2016/0110786 | A1 | 4/2016 | Herring et al. | |
| 2017/0031434 | A1 | 2/2017 | Files et al. | |
| 2017/0123454 | A1 * | 5/2017 | Evans, V | G02F 1/1368 |
| 2017/0140360 | A1 | 5/2017 | Naito | |
| 2017/0278362 | A1 | 9/2017 | Sekine et al. | |
| 2018/0084227 | A1 | 3/2018 | Migdal et al. | |
| 2018/0096567 | A1 | 4/2018 | Farrow et al. | |
| 2018/0189763 | A1 | 7/2018 | Olmstead et al. | |
| 2018/0314863 | A1 | 11/2018 | Gao et al. | |
| 2020/0065793 | A1 | 2/2020 | Kakino | |
| 2021/0042761 | A1 | 2/2021 | Migdal et al. | |
| 2021/0183212 | A1 * | 6/2021 | Wen | G07G 1/0063 |
| 2023/0013957 | A1 | 1/2023 | Farrow et al. | |
| 2023/0120798 | A1 | 4/2023 | Palande et al. | |

OTHER PUBLICATIONS

U.S. Appl. No. 16/451,705, U.S. Pat. No. 11,462,083, filed Jun. 25, 2019, Display with Integrated Cameras.

U.S. Appl. No. 17/951,738, filed Sep. 23, 2022, Display with Integrated Cameras.

"U.S. Appl. No. 16/451,705, Non Final Office Action mailed Feb. 22, 2022", 11 pgs.

"U.S. Appl. No. 16/451,705, Notice of Allowance mailed Jun. 7, 2022", 7 pgs.

"U.S. Appl. No. 16/451,705, Response filed May 20, 2022 to Non Final Office Action mailed Feb. 22, 2022", 7 pgs.

"U.S. Appl. No. 17/951,738, 312 Amendment filed Nov. 29, 2023", 4 pgs.

"U.S. Appl. No. 17/951,738, Non Final Office Action mailed Jun. 20, 2023", 11 pgs.

"U.S. Appl. No. 17/951,738, Notice of Allowance mailed Oct. 12, 2023", 7 pgs.

"U.S. Appl. No. 17/951,738, Preliminary Amendment filed Oct. 6, 2022", 6 pgs.

"U.S. Appl. No. 17/951,738, Response filed Sep. 20, 2023 to Non Final Office Action mailed Jun. 20, 2023", 6 pgs.

Mogg, Trevor, "Walmart using A.I.-powered cameras to spot dodgy shoppers at self-checkouts", <https://www.digitaltrends.com/cool-tech/walmart-using-ai-powered-cameras-to-spot-shoplifters-at-self-checkouts/>, (Jun. 21, 2019).

Wu, B., "An intelligent self-checkout system for smart retail", International Conference on System Science and Engineering (ICSSE), Puli, TW, (2016), 1-4.

* cited by examiner

DISPLAY WITH INTEGRATED CAMERAS

CROSS-REFERENCE TO RELATED APPLICATION

This application is a continuation of U.S. patent application Ser. No. 17/951,738, filed Sep. 23, 2022, which is a continuation of U.S. patent application Ser. No. 16/451,705, filed Jun. 25, 2019, now issued as U.S. Pat. No. 11,462,083, which applications and publications are incorporated herein by reference in their entirety.

BACKGROUND

Enterprises have deployed efficient Self-Checkouts (SCOs), which permit customers to perform self-checkouts thereby avoid long queues at cashier-assisted stations and reducing the number of cashiers that retailers need to staff at cashier-assisted stations to service their customers. SCOs have been available for many years and the industry has invested a significant amount of resources in persuading customers to use them in place of cashier-assisted stations. As a result, customers are accustomed to SCOs and have continued to migrate away from the cashier-assisted stations to the SCOs in recent years.

However, one concern with SCOs and cashier-assisted stations is theft by either the customer or the cashier. A significant and pervasive theft detection mechanism in the industry is a bagging scale. SCOs include bagging scales where the customer is expected to place a self-scanned item once the item barcode is captured. If the customer fails to properly place the item on the bagging scale, the SCO will suspend operation requiring store personnel to manually override the suspension before the customer transaction is permitted to proceed. Customers may not place scanned items in the bags for a variety of reasons, such as: the item is too large or is shaped too awkwardly to permit proper item placement in the bag, the customer desires to put the item in a bag that was already removed from the bagging area and is in the customer cart, and other reasons. Furthermore, the bagging scale often provides unreliable item weights for a variety of reasons.

These situations and others create a lot of false positive theft detection events that need to be manually overridden during checkout at the SCO; which, in many cases unnecessarily occupies store personnel time and frustrates customers. In fact, many retailers often turn off the item weight security feature during high customer traffic because the inconvenience and slow transaction throughput caused by false positives are viewed as more of an issue than any potential theft by the customers.

Consequently, security is still a continuing concern with SCOs and with cashier-assisted terminals (many cashier-assisted terminals lack any bagging scale altogether or often has such scales intentionally disabled).

Additionally, SCOs include a variety of peripheral devices to support ever-increasing desired features and functions. As a result, the physical footprints of the SCOs have become untoward, such that adding new peripherals has become problematic in the industry.

SUMMARY

In various embodiments, displays with integrated cameras having security processing features are provided.

According to an embodiment, a method for security transaction processing using images captured from a camera integrated into a display is presented. Images are received from a camera that is integrated into a display. A transaction is independently processed on a terminal and transaction details are produced. The transaction is audited based on the images and the transaction details.

DETAILED DESCRIPTION

Figure 1:
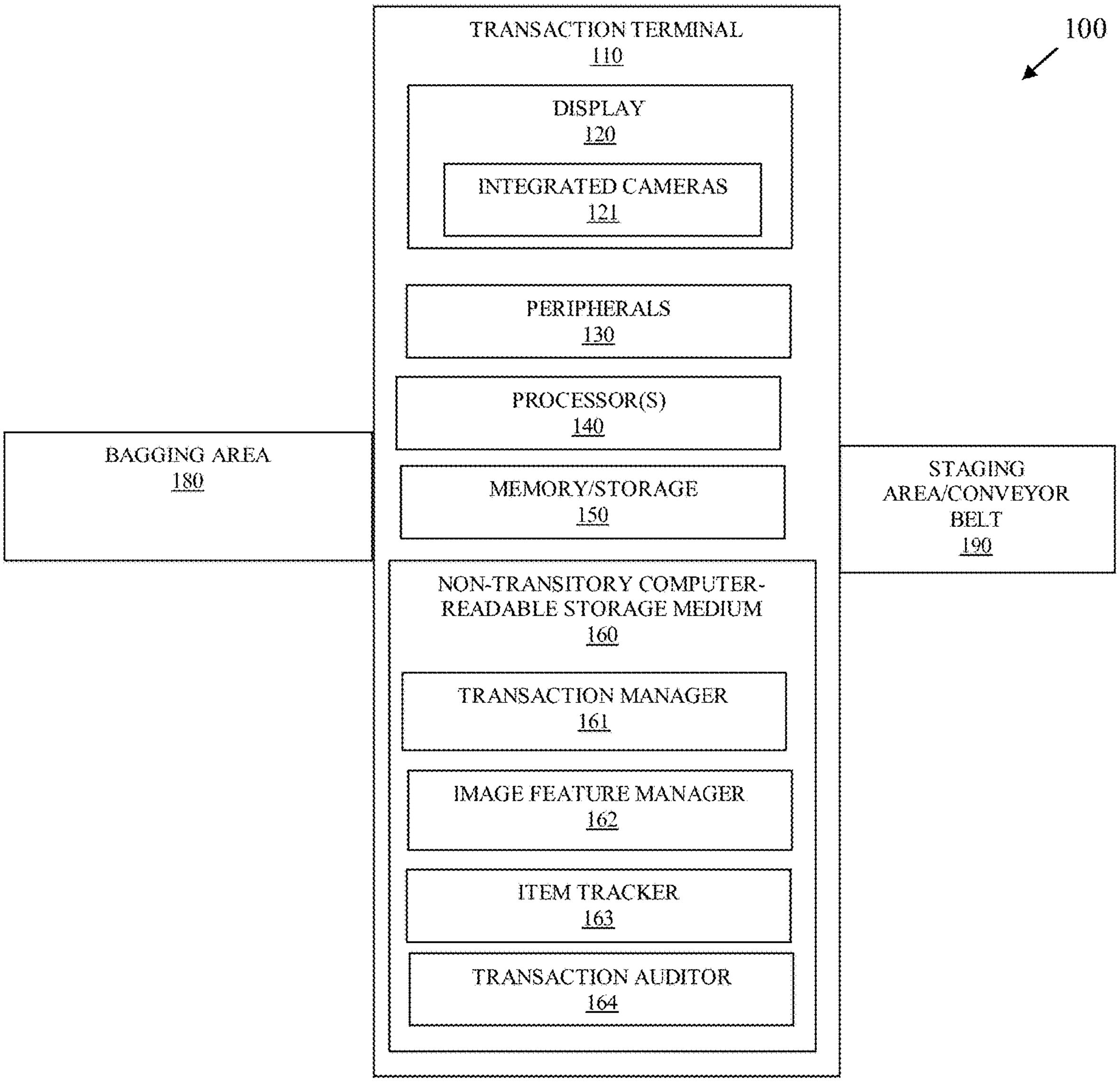
FIG. 1 is a diagram of a system having a display with integrated cameras and transaction security processing, according to an example embodiment.

FIG. 1 is a diagram of a system 100 having a display with integrated cameras and transaction security processing, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or with less components are possible without departing from the teachings of displays with integrated cameras and transaction security processing, presented herein and below.

As used herein and below, the terms “user,” “consumer,” “user,” and “customer” may be used interchangeably and synonymously. The terms refer to an individual placing an order at a transaction terminal.

As used herein the term “operator” refers to an individual that is operating a transaction terminal for purposes of conducting a transaction. An operator can be a cashier when the transaction terminal is a Point-Of-Sale (POS) terminal, where the cashier is operating the POS terminal to checkout a customer. Moreover, an operator can be a customer when the transaction terminal is a Self-Service Terminal (SST), the customer is performing a self-checkout at the SST.

As used herein a “SCO” is an SST.

The system 100 includes a transaction terminal 110 (herein after just “terminal 110”). The terminal 110 includes a novel display 120, which includes integrated cameras 121. The terminal 110 also includes a variety of integrated or interfaced peripherals 130 (swipe-based card reader, contactless card reader, keypad, coin and currency dispenser, check and currency accepter, coin accepter, scanner, cash drawer, media depository, receipt and coupon printer, media recycler, and others). Furthermore, the terminal 110 includes at least one processor 140, memory/storage 150, and non-transitory computer-readable storage medium 160 having executable instructions representing software modules for a transaction manager 161, image feature manager 162, item tracker 163, and a transaction auditor 164. Executable instructions when executed by processor 140 from non-transitory computer-readable storage medium 160 cause processor 140 to perform the process discussed herein and below for modules 161-164.

The system 100 also includes a bagging area 180 and a staging area/conveyor belt 190.

Terminal 110 is also connected to or situated between a bagging area 180 and a staging or conveyor belt 190. During item processing at terminal 110, items are placed in area 190, scanned by a peripheral scanner and/or weighed on a scale (can be an integrated single scanner/scale peripheral device 130), and/or identified through a touchscreen interface associated with display 120. Transaction manager 162 performs item code lookup and obtains item pricing and item descriptions for a given transaction. Each item is then moved to bagging area 180 after processed from the area 190 by terminal 100.

Conventionally, the bagging area includes a peripheral bagging scale, which reported an item weight for an item placed in the bagging area within a bag to transaction manager. Transaction manager then compared the item weight with an expected weight for the item based on item lookup information, and when the item weight was outside a threshold tolerance of the expected weight, transaction manager raised an exception that suspended the transaction processing until an assistant manually inspected the item and/or cleared the weight discrepancy. As previously mentioned, for a variety of reasons and the lack of reliability of bagging scales, false positives are excessive with the conventional approach.

Although this above-mentioned conventional processing may be retained in some embodiments presented herein, this conventional processing is no longer required or needed for transaction security processing with the teachings presented.

Display 120 includes at least two integrated cameras 121, each camera 121 is situated in a top corner of display 120 (one in a top left corner directed towards bagging area 180 and one in a top right corner directed towards staging area 190). The cameras 121 are built into the display 120 and include bus connections from the cameras to a processor motherboard of the display 120. That is, the display 120 includes its own processor, memory, and storage and the cameras have high-speed data bus connections directly to the motherboard of the display 120.

Moreover, because of the proximity of the cameras 121 to the bagging area 180 and the staging area 190, the cameras 121 do not have to be high quality or high megabyte pixel cameras 121. This reduces the expenses associated with manufacturing display 120 and reduces the amount of pixel data that is processed for resolving security concerns or performing transaction audits because the density of the pixels within the image is reduced with a smaller pixel image. In an embodiment, each camera 121 captures images having a density or quality of 2 megabytes per square inch.

The cameras 121 are not peripheral devices of the display 120, the cameras 121 are part of the display, such that capturing of images by the cameras can be streamed directly to memory and or storage of the display and are accessible to the processor of the display 120. The cameras 120 are also not tenuously affixed to an external surface of the display 120; rather, the cameras 120 are flush and integrated with the external surface of the display 120. The display 120 is manufactured such that small areas associated with the lenses of the cameras 121 are not part of the touchscreen surface of the display 120 (placed in a non-displayable area on top corner peripheries of the touchscreen surface). The amount of space occupied by the lenses of the two cameras 121 is very small such that there is no loss of visible display area on the display 120 from that which would be associated with a conventional display.

Accordingly, placement of the cameras 121 within the display 120 provide new and novel feature/function to the display 120 with a small physical footprint. In fact, the cameras 121 may be visually obscured such that they are non-noticeable to an operator of terminal 110.

Display 120 is connected directly to terminal 110 as a display peripheral over a high-speed display data connection or port. This allows modules 161-164 near instantaneous access to the pixel data of the images captured. That is, the image data does not have to traverse a network connection and is directly stored in memory and storage of the display 120. In some embodiments, as the image data is stored in memory of display 120 it is streamed and buffered to memory 150 of terminal 110.

Image feature manager 162 obtains each image captured by the cameras 121 during a transaction at terminal 110. The pixels then have features extracted such as edges, lines, sizes, dimensions, shapes, colors, packaging attributes, etc. Item tracker 163 scores and matches features to a known item of the store based on item image templates to identify a specific item. Item feature manager 162 and Item tracker 163 may also be trained on background images for the bagging area 180 and the staging area 190 for purposes of being able to remove pixel data associated with the background and separate foreground item pixel data from background pixel data associated with areas 180 and 190.

In an embodiment, item feature manager 162 and item tracker 163 are provided as a trained machine learning algorithm that is trained on known item images being processed through terminal 110. The machine-learning algorithm then develops factors and an algorithm such that when provided an image, a specific item is identified and its location within the bagging area 180 and staging area 190 provided.

Transaction auditor 164 receives as input item identifies that are being processed by transaction manager 161 along with item identifies and item location information (such as in bag in bagging area, last known bag, in staging area, etc.) provided by the item tracker 163. This allows auditor 164 to audit the transaction being processed at terminal 110. The auditing can include item counts to: 1) identify when there are more items in known bags then items that were processed by transaction manager 161 (potential item was moved from staging area and not scanned by terminal 110 and then placed in a known bag (barcode scanning avoidance)); 2) identify item mismatches where there is an item appearing in a known bag that was not identified by the transaction manager (item was placed in bag and not scanned by terminal 110 or an item that was scanned is not the same as the item in the known bag (potential barcode swapping occurred where a lower priced barcode was processed by terminal 110 from what the actual item was)); and 3) an item is accounted for in a known bag but was never identified in the staging area 190 and was never processed by terminal 110.

Because the security transaction processing is not reliant on any bag scale weight, false positives can be eliminated as well. For instance, transaction auditor 164 identifies an item in the staging area 190 and determines that such item was properly recorded by transaction manager 161. So, even if auditor 164 is never able to account for this item in a known bag, auditor 164 knows the audit is clean and no theft took place. This may be a situation where the item when straight from the terminal 110 to a customer's purse or customer's cart or where an item was removed from a bag and placed in the customer's purse or cart.

This makes security for the transaction more accurate and reduces false positive security alerts from conventional approaches and this represents a substantial improvement over conventional approaches that largely rely bag scales. Furthermore, because the cameras 121 are built into the motherboard of display 120, the image data is captured and processed significantly faster than other approaches relying on overhead external peripheral-based and network-based cameras. This means that security-based transaction decisions made by auditor 164 can occur in real time and are more practical than conventional approaches that are slower and that require substantial network bandwidth to stream and to provide the image data. Moreover, overhead peripheral cameras because of their lack of proximity (closeness) to the actual items being processed require higher quality cameras for accuracy, which further increases the amount of image data that must be processed. Still further, because of the distance of overhead cameras there is more image pixel noise in the captured image data that must be removed during the security processing (the conventional images include people and other structures unrelated to the items being processed for transaction security checking).

Figure 2:
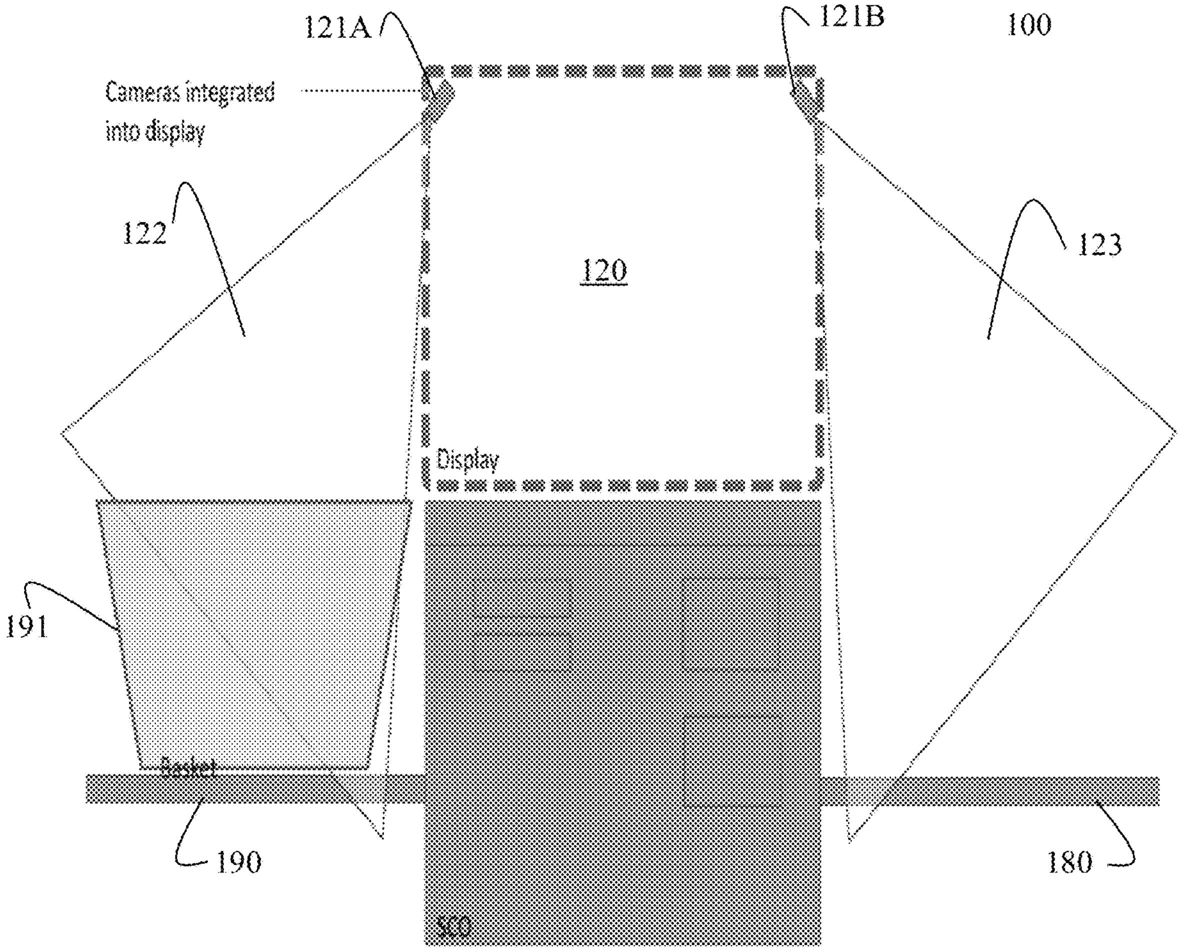
FIG. 2 is a diagram of another transaction terminal having a display with integrated cameras and transaction security processing, according to an example embodiment.

FIG. 2 is a diagram of another transaction terminal 110 having a display 120 with integrated cameras 121A and 121B and transaction security processing, according to an example embodiment.

A first camera 121A is integrated and built into display 120 in a top left corner and captures a field-of-view identified by the shaded triangle 122 within the bagging area 190, which includes a bag 191 or a basket 191 associated with the bagging area 190.

A second camera 121B is integrated and built into display 120 in a top right corner of display 120 and captures a field-of-view identified by the shaded triangle 123 within the staging area 180.

The cameras 121A and 121B are connected by a high-speed bus connection directly to the motherboard of display 120. As images are captured, each frame is nearly instantaneously available in memory or storage of display 120. A processor of display 120 may stream the images directly from memory to terminal 110 over a high-speed display port connection. Image feature manager 161 extracts item pixel features and provides to item tracker 163. Item tracker 163 identifies each item and its last recorded location (staging area 190, bagging area 180, a bag in bagging area, etc.). Auditor 164 interacts with transaction manager 161 and item tracker 163 to perform a transaction audit when transaction manager 161 indicates a transaction is ready for payment. Item barcode swapping/substitution, scanning avoidance, and new item introduction into the bagging area 190 are identified when present for the transaction. Auditor 164 notifies transaction manager 161 when theft is detected and/or sends an alert to one or more of: security systems and/or designated store personnel for purposes of manually inspecting the transaction before the customer can exit the store with the items of the transaction. Transaction manager 161 based on a security alert provided by auditor 164 may also perform the alert notification to one or more resources of the store and may suspend further processing of the transaction at terminal 110.

In an embodiment, auditor 164 index frames associated with the item that is associated with the discrepancy from the image frames and links the indexed frames to the alert. This allows store personnel to access/view video directly associated with the transaction discrepancy through an interface and allows such alerts and their corresponding video to be stored for auditing and staff security training purposes.

Although the above-mentioned description is discussed within the context of a transaction terminal associated with an SST or POS terminal, it is to be noted that embodiments of the invention can be used with Automated Teller Machines (ATMs) as well. In such a case, the cameras 121A and 121B are built into the ATM display and modules 162-164 are provided to evaluate behavior of people situated in front of the ATM. A trained machine-learning algorithm may be used as these modules 162-164. When behavior is identified as being associated with ATM tampering or other identified nefarious behavior, the ATM can be configured to send security alerts and/or automatically shut down.

In an embodiment terminal 110 is an SST. In an embodiment, the SST is a SCO terminal/station.

In an embodiment, terminal 110 is a POS terminal where the items are being tracked as they are processed at the terminal 110 by both a cashier and, maybe also, a customer. In this way, sweet hearting can be detected by auditor 164 (sweet hearting is when the cashier knows the customer and is actively engaged in theft with the customer during the checkout).

In an embodiment, terminal 110 is an ATM as discussed above where auditor 164 cooperates with modules 162 and 163 to identify security situations occurring at the ATM based on behaviors of people proximate to the ATM.

These and other embodiments are now discussed with reference to FIGS. 3-5.

Figure 3:
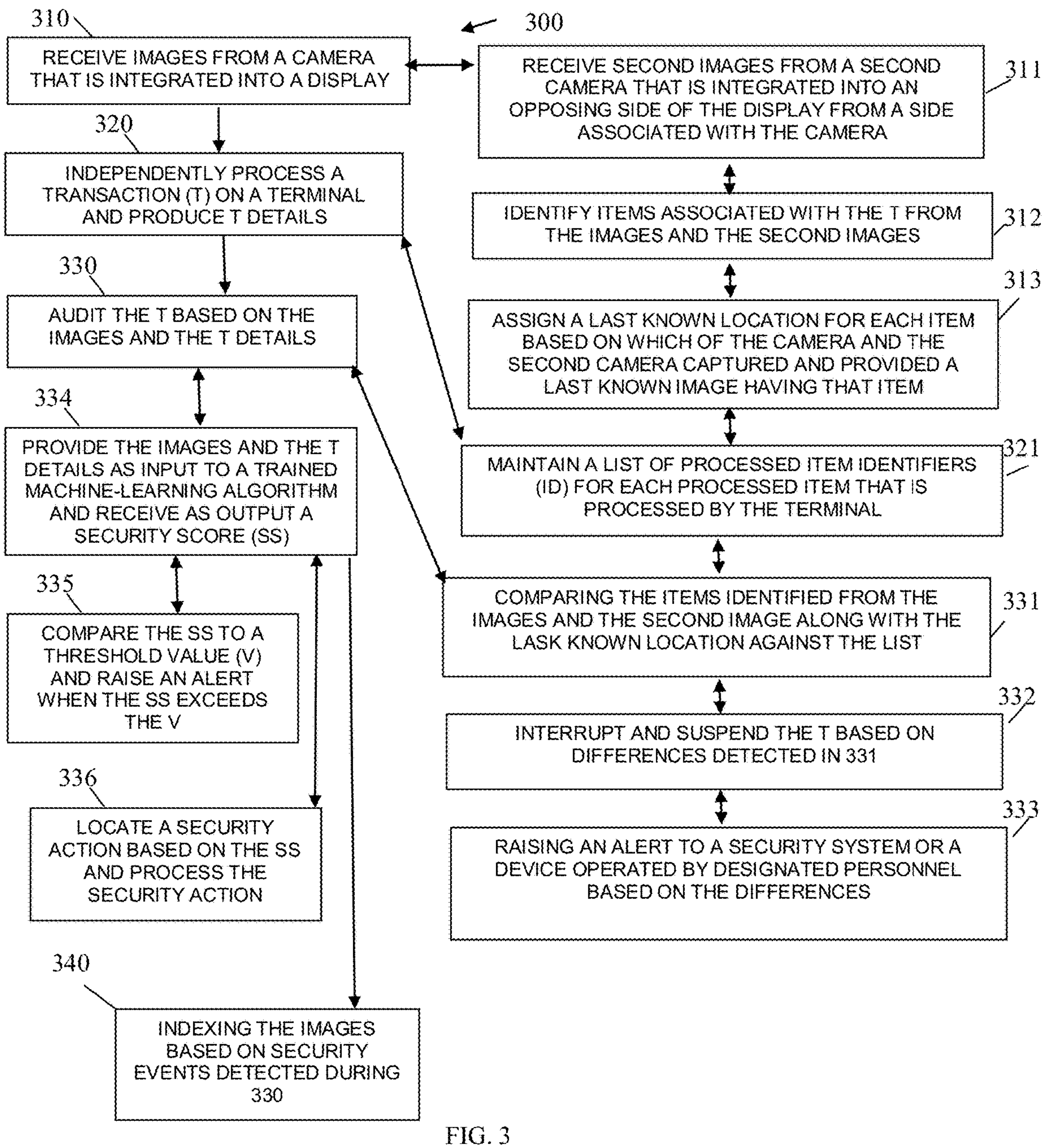
FIG. 3 is a diagram of a method for security processing at a transaction terminal having a display with integrated cameras, according to an example embodiment.

FIG. 3 is a diagram of a method 300 for security processing at a transaction terminal having a display with integrated cameras, according to an example embodiment. The software module(s) that implements the method 300 is referred to as a "transaction security agent." The transaction security agent is implemented as executable instructions programmed and residing within memory and/or a non-transitory computer-readable (processor-readable) storage medium and executed by one or more processors of a device. The processor(s) of the device that executes the transaction security agent are specifically configured and programmed to process the transaction security agent. The transaction security agent may or may not have access to a network connection, any such network connection can be wired and/or wireless.

In an embodiment, the device that executes the security agent is the terminal 110. In an embodiment, terminal 110 is an SST. In an embodiment, terminal 110 is a POS terminal. In an embodiment, terminal 110 is an ATM.

In an embodiment, the transaction security agent is all or some combination of the transaction manager 161, the image feature manager 162, the item tracker 163, and/or the transaction auditor 164.

At 310, the transaction security agent receives images from a camera that is integrated into a display. That is, the camera is integrated into the motherboard of the display and connected via a high-speed data bus. The camera lens is flush with a front display surface of the display and situated in a top corner of the front display surface.

In an embodiment, at 311, the transaction security agent receives second images from a second camera that is integrated into an opposing top upper corner of the display opposite the camera of 310 within the front display surface. One camera focused on an ingress or entry point for processing items of a transaction at a transaction terminal and the other camera focused on an egress or exit point for the items that have been processed by the transaction terminal.

In an embodiment of 311 and at 312, the transaction security agent identifies items associated with the transaction from the images and the second images.

In an embodiment of 312 and at 313, the transaction security agent assigns a last known location for each item based on which of the camera and the second camera that captured and provided a last known image having the item. That is, each camera is focused on an entry or exit point of the transaction terminal, such that the last available image for any given item is assigned a location of either the entry point or the exit point.

At 320, the transaction security agent independently processes a transaction on the transaction terminal 110 and the transaction manager 161 produces corresponding transaction details for the transaction.

In an embodiment of 313 and 320, at 321, the transaction security agent maintains a list of processed item identifiers for each processed item that is processed by the transaction terminal. A total count of items available in the list may also be maintained as well as a quantity of each specific item.

At 330, the transaction security agent audits the transaction based on the images and the transaction details provided by the transaction manager 161.

In an embodiment of 321 and 330, at 331, the transaction security agent compares items identified from the images and the second images along with the last known location for each item against the list (include item totals for the list and each item quantity from the list).

In an embodiment of 331 and at 332, the transaction security agent interrupts and suspends the transaction based on any differences detected from 331.

In an embodiment of 332 and at 333, the transaction security agent raises an alert to a security system or a device operated by designated personnel based on the differences.

In an embodiment of 330 and at 334, the transaction security agent provides the images and the transaction details as input to a trained machine-learning algorithm and receives as output a security score.

In an embodiment of 334 and at 335, the transaction security agent compares the security score to a threshold value and raises an alert when the security score exceeds the threshold value.

In an embodiment of 334 and at 336, the transaction security agent locates a security action based on the security score and processes the security action automatically.

In an embodiment, at 340, the transaction security agent indexes the images based on security events detected during the processing of 330.

Figure 4:
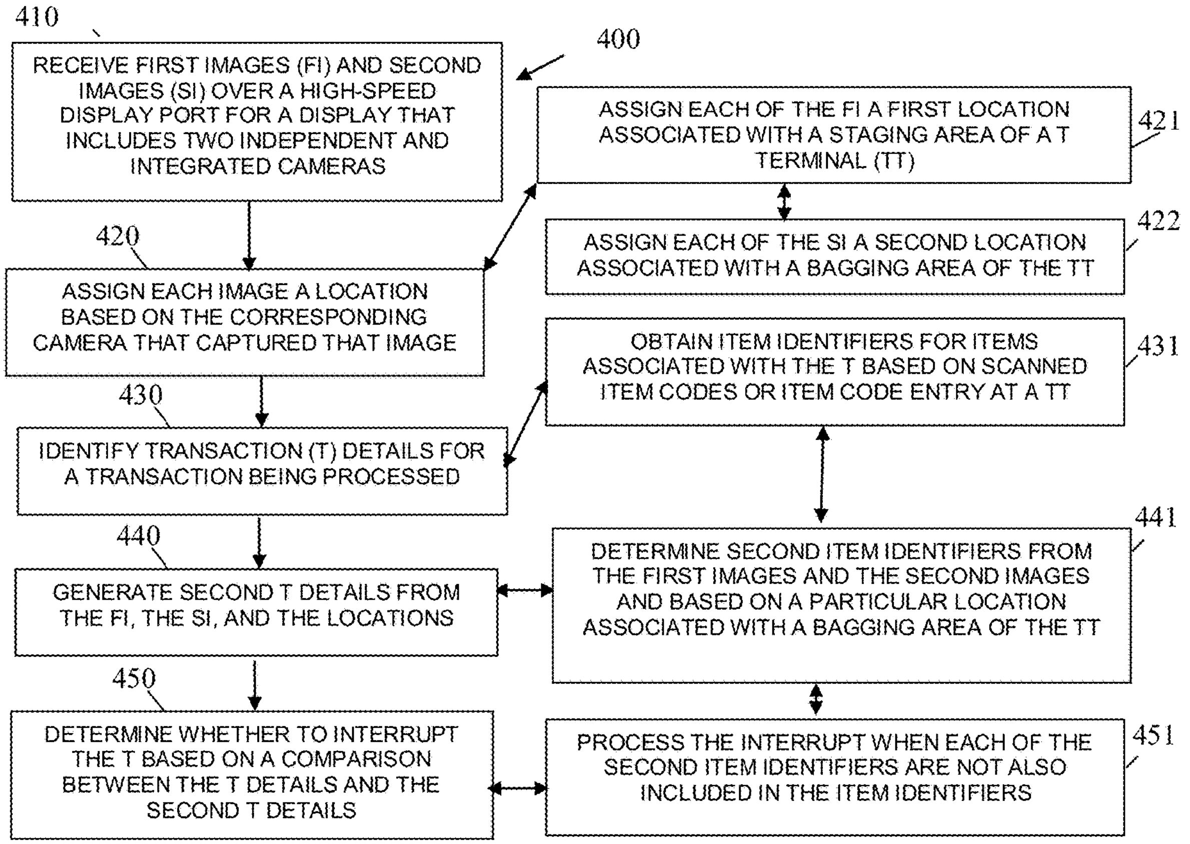
FIG. 4 is a diagram of another method for security processing at a transaction terminal having a display with integrated cameras, according to an example embodiment.

FIG. 4 is a diagram of another method 400 security processing at a transaction terminal having a display with integrated cameras, according to an example embodiment. The software module(s) that implements the method 400 is referred to as a "transaction security manager." The transaction security manager is implemented as executable instructions programmed and residing within memory and/or a non-transitory computer-readable (processor-readable) storage medium and executed by one or more processors of a device. The processors that execute the transaction security manager are specifically configured and programmed to process the transaction security manager. The s transaction security manager may or may not have access to one or more network connections during its processing. Any network connections can be wired, wireless, or a combination of wired and wireless.

In an embodiment, the device that execute the transaction security manager is the terminal 110. In an embodiment, the terminal 110 is an SST. In an embodiment, the terminal 110 is a POS terminal. In an embodiment, terminal 110 is an ATM.

In an embodiment, the transaction security manager is all of, or some combination of: transaction manager 161, image feature manager 162, item tracker 163, transaction auditor 164, and/or the method 300.

The transaction security manager presents another and, in some ways, enhanced processing perspective of the method 300.

At 410, the transaction security manager receives first images and second images over a high-speed display port for a display that includes two independent and integrated cameras. Each camera is integrated into one of two top corners of the display within the front display surface. In an embodiment, the first camera is camera 121A and the second camera is camera 121B.

At 420, the transaction security manager assigns each image a location based on the corresponding camera that captured that image. That is, each image is stamped with a camera identifier and each camera is known to capture images of a specific location.

In an embodiment, at 421, the transaction security manager assigns each of the first images a first location associated with a staging (entry point) area of a transaction terminal.

In an embodiment of 421 and at 422, the transaction security manager assigns each of the second images a second location associated with a bagging area (exit point) of the transaction terminal.

At 430, the transaction security manager identifies transaction details for a transaction being processed at the transaction terminal.

In an embodiment, at 431, the transaction security manager obtains item identifiers for items associated with the transaction based on scanned item codes from the items or item code entry for the items processed at the transaction terminal.

At 440, the transaction security manager generates second transaction details from the first images, the second images, and the locations.

In an embodiment of 431 and 440, at 441, the transaction security manager determines second item identifiers from the first images and the second images based on a particular location associated with a bagging area of the transaction terminal and last taken images for each of the images.

At 450, the transaction security manager determines whether to interrupt the transaction based on a comparison between the transaction details and the second transaction details.

In an embodiment of 441 and 450, at 451, the transaction security manager processes the interrupt when each of the second item identifiers are not also included in the item identifiers produced independently by the transaction terminal.

Figure 5:
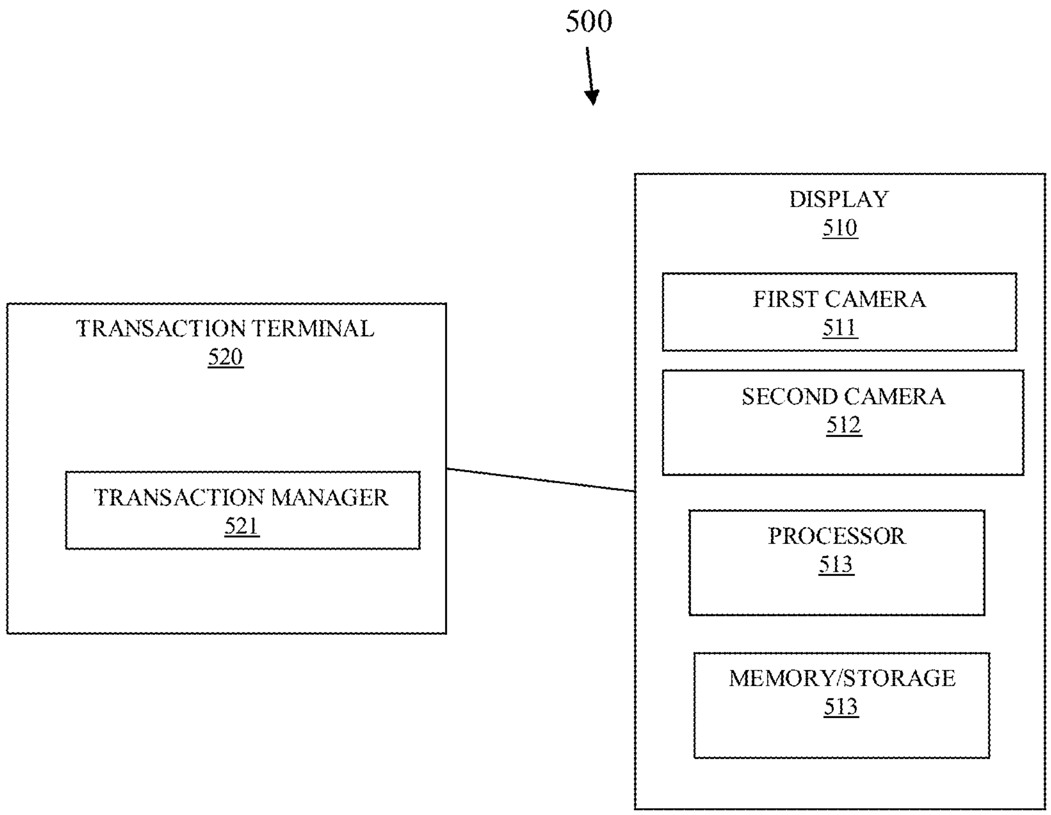
FIG. 5 is a diagram of a display with integrated cameras having transaction security processing, according to an example embodiment.

FIG. 5 is a diagram of a display 500 with integrated cameras having transaction security processing, according to an example embodiment. The display 500 includes a variety of hardware components and software components. The software components of the display 500 are programmed and reside within memory and/or a non-transitory computer-readable medium and execute on one or more processors of the display 500.

In an embodiment, the display 500 captures and provides the images associated with the processing discussed above in the FIGS. 1-4.

The display 500 includes: a first integrated camera 511, a second integrated camera 512, a processor, and memory/storage 513.

The display 500 is connected by a high-speed display port to a transaction terminal 520. In an embodiment, transaction terminal 520 is terminal 110.

In an embodiment, the display 500 is the display 120.

In an embodiment, the display 500 is a touchscreen display.

In an embodiment, the display 500 is a non-touchscreen display.

The first camera 511 captures images of a bagging area associated with the transaction terminal 520, and the second camera 512 captures other images of a staging area associated with the transaction terminal 520.

The processor 513 is configured to stream the images and the other images from the non-transitory memory/storage 513 over the high-speed display port to the transaction terminal 520 during transaction processing at the transaction terminal 520.

In an embodiment, the first camera 511 and the second camera 512 are integrated into a same motherboard of display 510 as processor 513 and memory/storage 513.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:

obtaining first images from a first integrated camera of a terminal, wherein the first integrated camera is integrated into a first top corner of a touch screen surface and focused on an item staging area of the terminal during a transaction;

obtaining second images from a second integrated camera of the terminal, wherein the second integrated camera is integrated into a second top corner of the touch screen surface and focused on a bagging area of the terminal during the transaction; and evaluating the first images and the second images in connection with the terminal processing the transaction and comparing transaction details produced by the terminal in view of the evaluating to determine whether an audit is needed for the transaction.

2. The method of claim 1, wherein the first top corner and the second top corner are opposing corners on a display associated with the touch screen surface.

3. The method of claim 1, wherein obtaining the first images and the second images further include identifying items for the transaction depicted in the first images and the second images.

4. The method of claim 3, wherein identifying further includes maintaining last known locations for the items based on the first images and the second images.

5. The method of claim 1, wherein obtaining the first images and the second images further include maintaining a list of processed item identifiers for each processed item that is processed by the terminal.

6. The method of claim 1, wherein evaluating further includes interrupting and suspending the transaction based on differences detected between the evaluating and the list of processed item identifiers.

7. The method of claim 6, wherein interrupting and suspending further includes raising an alert to a security system or a device operated by designated personnel based on the differences.

8. The method of claim 1, wherein evaluating further includes providing the first images, the second images, and the transaction details as input to a machine-learning algorithm as input and receiving as output a security score.

9. The method of claim 8, wherein providing further includes comparing the security score to a threshold and raising the alert when the security score exceeds the threshold.

10. The method of claim 9, wherein providing further includes identifying a security action based on the security score and processing the security action.

11. The method of claim 1 further comprising, indexing the first images and the second images based on a security event during the evaluating.

12. The method of claim 1, wherein indexing further includes providing access to video comprising the first images and the second images via an interface.

13. A method, comprising:

obtaining first images and second images from two cameras integrated into corners of a touch-screen display, wherein the first camera configured to capture the first images of a staging area of a terminal and the second camera configured to capture the second images of a bagging area of the terminal;

identifying transaction details produced by the terminal as items are processed at the terminal for a transaction;

maintaining last known locations for each of the items based on evaluation of the first images and the second images; and interrupting the transaction for an audit when the last known locations for each of the items indicate one or more discrepancies with the transaction details.

14. The method of claim 13, wherein identifying further includes assigning item identifiers for certain first items depicted in the first images based on scanned item codes provided in the transaction details.

15. The method of claim 14, wherein identifying further includes determining whether the certain first items match other items depicted in the second images.

16. The method of claim 15, wherein interrupting further includes causing the audit when certain other items besides the certain items are detected during the transaction.

17. The method of claim 13, wherein the terminal is a point-of-sale terminal or a self-service terminal.

18. A terminal, comprising:

a processor;

a memory comprising executable instructions;

a touch screen display comprising a first integrated camera integrated into a first corner of a touch screen surface of the touch screen display and a second integrated camera integrated into a second corner of the touch screen surface;

the instructions when executed by the processor cause the processor to perform operations comprising:

analyzing first images provided of a staging area by the first integrated camera;

analyzing second images provided of a bagging area by the second integrated camera;

evaluating transaction details for items scanned during a transaction at the terminal in view of the analyzing of the first images and the second images; and suspending the transaction for an audit when there is a discrepancy between the items and tracked items associated with the first images and the second images based on the evaluating.

19. The terminal of claim 18, wherein the terminal is a point-of-sale terminal or a self-service terminal.

* * * * *